(12) United States Patent
Zhang et al.

(10) Patent No.: US 11,892,380 B1
(45) Date of Patent: Feb. 6, 2024

(54) HEAT TRANSFER LIMIT EXPERIMENTAL DEVICE OF HIGH-TEMPERATURE HEAT PIPE EQUIPPED WITH CONVENIENT TEMPERATURE MEASUREMENT BOX AND METHOD

(71) Applicant: Chengdu University of Technology, Chengdu (CN)

(72) Inventors: Muhao Zhang, Chengdu (CN); Wei Chen, Chengdu (CN); Suyi Zhang, Chengdu (CN); Xu Zhang, Chengdu (CN); Xiaoqiang He, Chengdu (CN); Shuhua Ding, Chengdu (CN); Yugao Ma, Chengdu (CN)

(73) Assignee: Chengdu University of Technology, Chengdu (CN)

( * ) Notice: Subject to any disclaimer, the term of this patent is extended or adjusted under 35 U.S.C. 154(b) by 0 days.

(21) Appl. No.: 18/133,540

(22) Filed: Apr. 12, 2023

(30) Foreign Application Priority Data

Nov. 1, 2022 (CN) .......................... 202211352670.0

(51) Int. Cl.
 *G01M 99/00* (2011.01)
(52) U.S. Cl.
 CPC ..... *G01M 99/002* (2013.01); *F28F 2200/005* (2013.01)
(58) Field of Classification Search
 CPC ..................... G01M 99/002; F28F 2200/005
 See application file for complete search history.

(56) References Cited

U.S. PATENT DOCUMENTS

2007/0107870 A1  5/2007 Liu et al.
2009/0190627 A1* 7/2009 Liu .................. G01K 17/00
                                                       374/147

FOREIGN PATENT DOCUMENTS

CN       105424745 A  *  3/2016
CN       105424745 A     3/2016
(Continued)

OTHER PUBLICATIONS

Jianyin Miao et al., "Testing method for heat transfer performance of heat pipes", GB/T 14812-2008, pp. 4-5, China, Jun. 26, 2008.
(Continued)

*Primary Examiner* — Brandi N Hopkins
*Assistant Examiner* — Janice M Soto (57) ABSTRACT

The present disclosure provides a heat transfer limit experimental device of a high-temperature heat pipe equipped with a convenient temperature measurement box and a method based on the heat transfer limit experimental device. The heat transfer limit experimental device includes a high-temperature heat pipe, an electric heating system, a convenient temperature measurement box, a control system, a gas-cooled heat exchange system, and a data acquisition system. The electric heating system is connected to the high-temperature heat pipe. The convenient temperature measurement box is connected to the gas-cooled heat exchange system. The data acquisition system is connected to the gas-cooled heat exchange system, the convenient temperature measurement box, and the electric heating system. The control system is connected to the gas-cooled heat exchange system, the convenient temperature measurement box, and the electric heating system. The high-temperature heat pipe is disposed inside the convenient temperature measurement box.

4 Claims, 9 Drawing Sheets

(56) References Cited

FOREIGN PATENT DOCUMENTS

| | | | | |
|---|---|---|---|---|
| CN | 208350222 | U | * | 1/2019 |
| CN | 208350222 | U | | 1/2019 |
| CN | 110988029 | A | * | 4/2020 |
| CN | 110988029 | A | | 4/2020 |
| CN | 214096393 | U | | 8/2021 |
| CN | 113567491 | A | | 10/2021 |
| CN | 113899783 | A | | 1/2022 |
| CN | 217638802 | U | | 10/2022 |
| FR | 1045338 | A | | 11/1953 |

OTHER PUBLICATIONS

Zhao, Wei Lin, "Transient Temperature Effect of High Temperature Heat Pipe", Industrial Furnace, vol. 25, No. 3, pp. 8-10, Aug. 2003.
Xiao, Hongzhi et al., "The investigation on heat transfer limit of micro heat pipe", Cryo. & Supercond., vol. 38, No. 5, pp. 76-78, May 2010.

* cited by examiner

HEAT TRANSFER LIMIT EXPERIMENTAL DEVICE OF HIGH-TEMPERATURE HEAT PIPE EQUIPPED WITH CONVENIENT TEMPERATURE MEASUREMENT BOX AND METHOD

TECHNICAL FIELD

The present disclosure relates to the technical field of heat pipes, and in particular to a heat transfer limit experimental device of a high-temperature heat pipe equipped with a convenient temperature measurement box and a method.

BACKGROUND

A high-temperature heat pipe is a high-efficiency heat transfer apparatus which realizes heat transfer through two-phase flow circulation. The common heat pipe working fluid is sodium, potassium, lithium, and the like. Due to the characteristics of high latent heat of vaporization and high thermal conductivity, the high-temperature heat pipe has been widely used in the new energy technologies, such as space nuclear power generation, solar energy storage, distributed heat source, ultra-high-speed aircraft thermal energy. Generally, the high-temperature heat pipe includes a casing, a liquid absorption core, and an alkali-metal working fluid. The alkali-metal working fluid vaporizes by absorbing heat at the hot end (evaporator section), and flows to the cold end (condensation section) under the action of a pressure difference, and then flows back to the hot end under the action of the liquid absorption core. Through such circulation, the heat is continuously transferred from the hot end to the cold end. Based on the heat transfer mechanism of the heat pipe, its equivalent thermal resistance is 1-2 orders of magnitude lower than those of copper, silver, and other thermal conductive materials, so the heat pipe can realize long-distance heat transfer with low thermal resistance and low temperature difference. Although the heat pipe possesses outstanding heat transfer capacity, it is still limited by many factors, which form the heat transfer limit and thereby restricting the working capacity of the heat pipe. Therefore, experimental studies on the heat transfer limit and the constraints of the heat pipe are important in development and design of the heat pipe.

To carry out the experimental studies on the heat transfer limit of the high-temperature heat pipe, the cooling capacity of the cold end needs to be adjusted rapidly in a large range. In the related art, a water-cooled jacket with gas gap or an oil-cooled jacket with gas gap is used as the heat exchange apparatus of the cold end of the high-temperature heat pipe. The water-cooled jacket with gas gap and the oil-cooled jacket with gas gap change the cooling capacity by changing the gas ratio in the gas gap, or the water/oil temperature, and the mass flow rate. The adjustment speed and range are limited by the physical properties of water/oil, which fail to meet the requirements for the experimental studies on the heat transfer limit that the cooling capacity needs to be adjusted rapidly in a large range.

SUMMARY

In view of the foregoing deficiencies, the present disclosure provides a heat transfer limit experimental device of a high-temperature heat pipe equipped with a convenient temperature measurement box and a method, which solves the problems that the existing device has the disadvantages that the cooling capacity is slow in adjustment speed and narrow in adjustment range; as well as the existing temperature measurement method has inconvenient installation and disassembly process, which is prone to mistakes, thereby leading to inaccurate temperature measurement.

In order to achieve the foregoing objectives, the solutions adopted in the present disclosure are described below.

The present disclosure provides a heat transfer limit experimental device of a high-temperature heat pipe equipped with a convenient temperature measurement box, including: a high-temperature heat pipe, an electric heating system, a convenient temperature measurement box, a control system, a gas-cooled heat exchange system, and a data acquisition system. The electric heating system is connected to the high-temperature heat pipe. The convenient temperature measurement box is connected to the gas-cooled heat exchange system. The data acquisition system is connected to the gas-cooled heat exchange system, the convenient temperature measurement box, and the electric heating system. The control system is connected to the gas-cooled heat exchange system, the convenient temperature measurement box, and the electric heating system. The high-temperature heat pipe is disposed inside the convenient temperature measurement box.

In some embodiments, the convenient temperature measurement box includes a box body, thermal insulation filling material, a conduit, step motors, a clamp component, a fixing plate, two slide rails, a K-type insulated thermocouple, a gas-cooled jacket support plate, and a bolt. The gas-cooled jacket support plate is disposed on the top of the box body. The bolt is fixed to the gas-cooled jacket support plate. The thermal insulation filling material is located inside the box body. The two slide rails are disposed at an upper end and a lower end of the box body respectively. An end of each slide rail is disposed with one of the step motors. The step motors are connected to the fixing plate through screws, and configured to drive the fixing plate to move. An end of the clamp component is horizontally fixed to the fixing plate, and configured to clamp and fix an end of the K-type insulated thermocouple by a clamp head. The other end of the K-type insulated thermocouple is disposed in the conduit. The conduit passes through the box body, and terminates at the high-temperature heat pipe. The K-type insulated thermocouple is pushed to move by the fixing plate.

In some embodiments, the electric heating system includes an electric heating wire and a direct-current (DC) power supply. The DC power supply is connected to the electric heating wire. The electric heating wire is spirally wound around an end of the high-temperature heat pipe.

In some embodiments, the gas-cooled heat exchange system includes an air compressor, a gas storage tank, a filter, a refrigerant dryer, a pressure reducing valve, a first shut-off valve, a first mass flow controller, a gas heater, a safety valve, a first check valve, a second shut-off valve, a second mass flow controller, a second check valve, a gas mixer, a differential pressure mass flowmeter, a pressure transmitter, a gas-cooled jacket, and a back pressure control valve. The air compressor is connected to an inlet of the gas storage tank. An outlet of the gas storage tank is connected to an inlet of the filter. An outlet of the filter is connected to an inlet of the refrigerant dryer. An outlet of the refrigerant dryer is connected to an inlet of the pressure reducing valve. An outlet of the pressure reducing valve is connected to an inlet of the first shut-off valve and an inlet of the second shut-off valve via a three-way pipe. An outlet of the first shut-off valve is connected to an inlet of the first mass flow controller. An outlet of the first mass flow controller is connected to an inlet of the gas heater. An outlet of the gas heater is connected to an inlet of the first check valve and the safety valve. An outlet of the first check valve is connected to a first inlet of the gas mixer. An outlet of the gas mixer is connected to an inlet of the differential pressure mass flowmeter. An outlet of the differential pressure mass flowmeter is connected to an inlet of the pressure transmitter. An outlet of the pressure transmitter is connected to an inlet of the gas-cooled jacket. An outlet of the gas-cooled jacket is connected to the back pressure control valve. An outlet of the second shut-off valve is connected to an inlet of the second mass flow controller. An outlet of the second mass flow controller is connected to an inlet of the second check valve. An outlet of the second check valve is connected to a second inlet of the gas mixer.

In some embodiments, the data acquisition system includes an inlet thermocouple, an outlet thermocouple, the K-type insulated thermocouple, a data acquisition card, and a computer. The data acquisition card is connected to the inlet thermocouple, the outlet thermocouple, and the K-type insulated thermocouple. The computer is connected to the data acquisition card.

In some embodiments, the heat transfer limit experimental device further includes the control system: the computer is connected to the first mass flow controller, the gas heater, the second mass flow controller, the back pressure control valve, and the step motors.

In some embodiments, the gas-cooled jacket includes a threaded hole, a first gas-cooled jacket inlet, a second gas-cooled jacket inlet, and a gas-cooled jacket outlet. The gas-cooled jacket is disposed outside the high-temperature heat pipe. The gas-cooled jacket is fixed to the gas-cooled jacket support plate by a nut after the bolt passes through the threaded hole. The first gas-cooled jacket inlet is disposed on a side of the bottom the gas-cooled jacket. The second gas-cooled jacket inlet is disposed on the other side of the bottom of the gas-cooled jacket. The gas-cooled jacket outlet is disposed at the top of the gas-cooled jacket.

The present disclosure further provides a method, based on the foregoing heat transfer limit experimental device, the method including the following steps:

S1. checking that each component of the heat transfer limit experimental device is connected, turning on a power supply of the computer, turning on the data acquisition system and the control system, and determining what type of experiment is performed; performing step S2 in a case of sound-speed heat transfer limit experiment, and performing step S7 in a case of capillary heat transfer limit experiment;

S2. turning on the electric heating system, to increase a heating power to a heating power required for an experimental working condition at a speed of 10 W per minute, and keeping the heating power unchanged;

S3. turning on the gas-cooled heat exchange system, and controlling, by the control system, the first mass flow controller, the gas heater, the second mass flow controller, the gas mixer, and the back pressure control valve, to change a temperature and a mass flow rate of gas, so as to meet a condensation power condition required by the experimental working condition;

S4. controlling, by the control system, the step motors to move, to allow the K-type insulated thermocouple in attachment with an outer wall surface of the high-temperature heat pipe, measuring temperatures of an evaporator section and an adiabatic section of the high-temperature heat pipe, and transmitting, by the data acquisition card, measured data to the computer;

S5. observing, by the computer, a change in a temperature of the K-type insulated thermocouple, and in a case that the temperature of the K-type insulated thermocouple increases less than 1° C. at an interval of 10 minutes, recording experimental data, and performing step S6; otherwise, repeating step S5;

S6. adjusting, by the control system, the gas to a subsequent temperature and a mass flow rate, to continue the current experiment;

S7. turning on the gas-cooled heat exchange system, controlling, by the control system, the first mass flow controller, the gas heater, the second mass flow controller, the gas mixer, and the back pressure control valve to adjust the gas to a temperature and a mass flow rate required by the experimental working condition, and keeping the temperature and the mass flow rate of the gas unchanged;

S8. controlling, by the control system, the step motors to move, to allow the K-type insulated thermocouple in attachment with an outer wall surface of the high-temperature heat pipe, measuring temperatures of the evaporator section and the adiabatic section of the high-temperature heat pipe, and transmitting, by the data acquisition card, measured data to the computer; and S9. turning on the electric heating system, to increase a heating power at a rate of 20 W per minute, and observing, by the computer, a change in a temperature of the K-type insulated thermocouple, and in a case that the temperature of the K-type insulated thermocouple increases more than 2° C. per second, cutting off a power supply of the electric heating system, and recording experimental data.

The present disclosure has the following beneficial effects:

1. For the heat transfer limit of the high-temperature heat pipe, the present disclosure provides the heat transfer limit experimental device that exchanges heat through gas cooling, which can adjust the gas temperature rapidly in a large range. This allows the cooling capacity to be changed rapidly in a large range, thereby meeting experimental requirements for the heat transfer limit of the high-temperature heat pipe.

2. According to the convenient temperature measurement box provided by the present disclosure, the fixing plate is driven by the step motors, to drive the K-type insulated thermocouple to move back and forth. There is no need to mount the K-type insulated thermocouple during the assembly of the experimental system, thereby improving efficiency and reducing human errors. In addition, the step motors controlled by the program can feedback the resistance signal, to allow the K-type insulated thermocouple to be in close attachment with the outer wall of the heat pipe, thereby improving the accuracy of the temperature measurement data.

REFERENCE NUMERALS 1. convenient temperature measurement box; 2. electric heating system; 3. computer; 4. data acquisition card; 5. K-type insulated thermocouple; 6. high-temperature heat pipe; 7. air compressor; 8. gas storage tank; 9, filter; 10. refrigerant dryer; 11. pressure reducing valve; 12. first shut-off valve; 13. first mass flow controller; 14. gas heater; 15. safety valve; 16. first check valve; 17. second shut-off valve; 18. second mass flow controller; 19. second check valve; 20. gas mixer; 21. differential pressure mass flowmeter; 22. pressure transmitter; 23. gas-cooled jacket; 24. back pressure control valve 25 inlet thermocouple; 26. outlet thermocouple; 27. DC power supply; 28. electric heating wire; 29. box body; 30. thermal insulation filling material; 31 conduit; 32. step motor; 33. clamp component; 34. fixing plate; 35. slide rail; 36. gas-cooled jacket support plate; 37. bolt; 38. first gas-cooled jacket inlet; 39. second gas-cooled jacket inlet; 40. gas-cooled jacket outlet; 41, threaded hole; 42. clamp head.

DETAILED DESCRIPTION OF THE EMBODIMENTS

The specific embodiments of the present disclosure are described below to facilitate those skilled in the art to understand the present disclosure. It will be appreciated that the present disclosure is not limited to the scope of the specific embodiments. Various changes are obvious to those skilled in the art as long as they are within the spirit and scope of the present disclosure. All other embodiments using the concept of the present disclosure are within the scope of the present disclosure.

Figure 1:
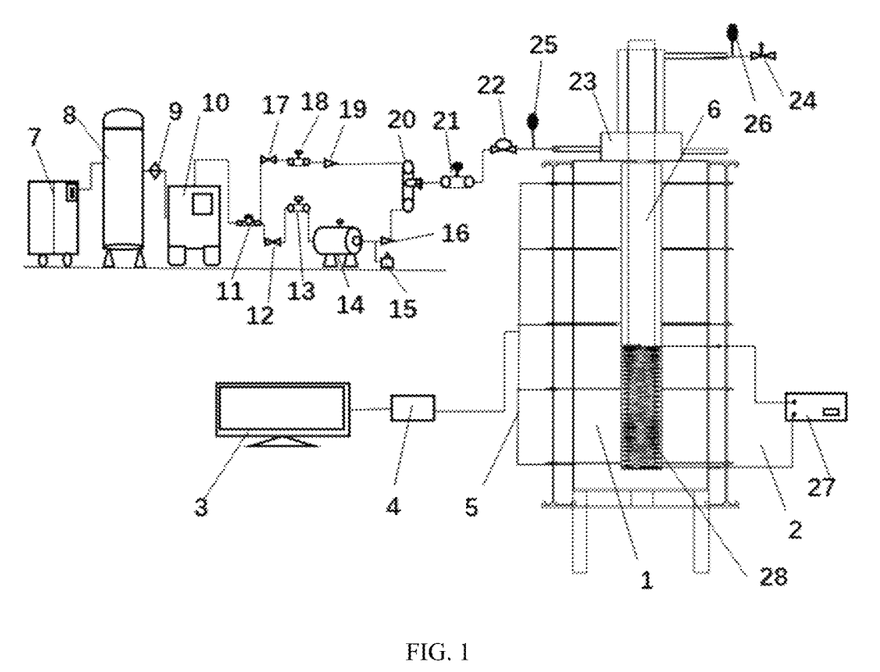
FIG. 1 is a structural diagram of a system.

As shown in FIG. 1, a heat transfer limit experimental device of a high-temperature heat pipe equipped with a convenient temperature measurement box is provided, which includes a high-temperature heat pipe 6, an electric heating system 2, a convenient temperature measurement box 1, a control system, a gas-cooled heat exchange system, and a data acquisition system. The electric heating system 2 is connected to the convenient temperature measurement box 1. The convenient temperature measurement box 1 is connected to the gas-cooled heat exchange system. The data acquisition system is connected to the gas-cooled heat exchange system, the convenient temperature measurement box 1, and the electric heating system 2. The control system is connected to the gas-cooled heat exchange system, the convenient temperature measurement box 1, and the electric heating system 2.

The electric heating system 2 includes an electric heating wire 28 and a DC power supply 27. The DC power supply 27 is connected to the electric heating wire 28. The electric heating wire 28 is spirally wound around an end of the high-temperature heat pipe 6.

The gas-cooled heat exchange system includes an air compressor 7, a gas storage tank 8, a filter 9, a refrigerant dryer 10, a pressure reducing valve 11, a first shut-off valve 12, a first mass flow controller 13, a gas heater 14, a safety valve 15, a first check valve 16, a second shut-off valve 17, a second mass flow controller 18, a second check valve 19, a gas mixer 20, a differential pressure mass flowmeter 21, a pressure transmitter 22, a gas-cooled jacket 23, and a back pressure control valve 24. The air compressor 7 is connected to the inlet of the gas storage tank 8. The outlet of the gas storage tank 8 is connected to the inlet of the filter 9. The outlet of the filter 9 is connected to the inlet of the refrigerant dryer 10. The outlet of the refrigerant dryer 10 is connected to the inlet of the pressure reducing valve 11. The outlet of the pressure reducing valve 11 is connected to the inlet of the first shut-off valve 12 and the inlet of the second shut-off valve 17 via a three-way pipe. The outlet of the first shut-off valve 12 is connected to the inlet of the first mass flow controller 13. The outlet of the first mass flow controller 13 is connected to the inlet of the gas heater 14. The outlet of the gas heater 14 is connected to the inlet of the first check valve 16 and the safety valve 15. The outlet of the first check valve 16 is connected to the first inlet of the gas mixer 20. The outlet of the gas mixer 20 is connected to the inlet of the differential pressure mass flowmeter 21. The outlet of the differential pressure mass flowmeter 21 is connected to the inlet of the pressure transmitter 22. The outlet of the pressure transmitter 22 is connected to the inlet of the gas-cooled jacket 23. The outlet of the gas-cooled jacket 23 is connected to a back pressure control valve 24. The outlet of the second shut-off valve 17 is connected to an inlet of a second mass flow controller 18. The outlet of the second mass flow controller 18 is connected to the inlet of the second check valve 19. The outlet of the second check valve 19 is connected to the second inlet of the gas mixer 20.

The data acquisition system includes an inlet thermocouple 25, an outlet thermocouple 26, a K-type insulated thermocouple 5, a data acquisition card 4, and a computer 3. The data acquisition card 4 is connected to the inlet thermocouple 25, the outlet thermocouple 26, and the K-type insulated thermocouple 5. The computer 3 is connected to the data acquisition card 4.

The control system: the computer 3 is connected to the first mass flow controller 13, the gas heater 14, the second mass flow controller 18, the back pressure control valve 24, and step motors 32.

The present disclosure provides a method, based on the foregoing heat transfer limit experimental device, the method including the following steps:

S1. checking that each component of the heat transfer limit experimental device is connected, turning on a power supply of the computer 3, turning on the data acquisition system and the control system, and determining what type of experiment is performed; performing step S2 in a case of sound-speed heat transfer limit experiment, and performing step S7 in a case of capillary heat transfer limit experiment;

S2. turning on the electric heating system 2, to increase a heating power to the heating power required for an experimental working condition at a rate of 10 W per minute, and keeping the heating power unchanged;

S3. turning on the gas-cooled heat exchange system, and controlling, by the control system, the first mass flow controller 13, the gas heater 14, the second mass flow controller 18, the gas mixer 20, and the back pressure control valve 24, to change a temperature and a mass flow rate of gas, so as to meet a condensation power condition required by the experimental working condition;

S4. controlling, by the control system, the step motors 32 to move, to allow the K-type insulated thermocouple 5 in attachment with an outer wall surface of the high-temperature heat pipe 6, measuring temperatures of an evaporator section and an adiabatic section of the high-temperature heat pipe 6, and transmitting, by the data acquisition card 4, measured data to the computer 3;

S5. observing, by the computer 3, a change in the temperature of the K-type insulated thermocouple 5, and in a case that an increase in the temperature of the K-type insulated thermocouple 5 is less than 1° C. at an interval of 10 minutes, recording experimental data, and performing step S6; otherwise, repeating step S5;

S6. adjusting, by the control system, the gas to a subsequent temperature and a mass flow rate, to continue the current experiment;

S7. turning on the gas-cooled heat exchange system, controlling, by the control system, the first mass flow controller 13, the gas heater 14, the second mass flow controller 18, the gas mixer 20 and the back pressure control valve 24 to adjust the gas to a temperature and a mass flow rate required by the experimental working condition, and keeping the temperature and the mass flow rate of the gas unchanged;

S8. controlling, by the control system, the step motors 32 to move, to allow the K-type insulated thermocouple 5 in attachment with the outer wall surface of the high-temperature heat pipe 6, measuring temperatures of the evaporator section and the adiabatic section of the high-temperature heat pipe 6, and transmitting, by the data acquisition card 4, measured data to the computer 3; and S9. turning on the electric heating system 2, to increase a heating power at a rate of 20 W per minute, and observing, by the computer 3, a change in the temperature of the K-type insulated thermocouple 5, and in a case that an increase in the temperature of the K-type insulated thermocouple 5 exceeds 2° C. per second, cutting off a power supply of the electric heating system 2, and recording experimental data.

Figure 2:
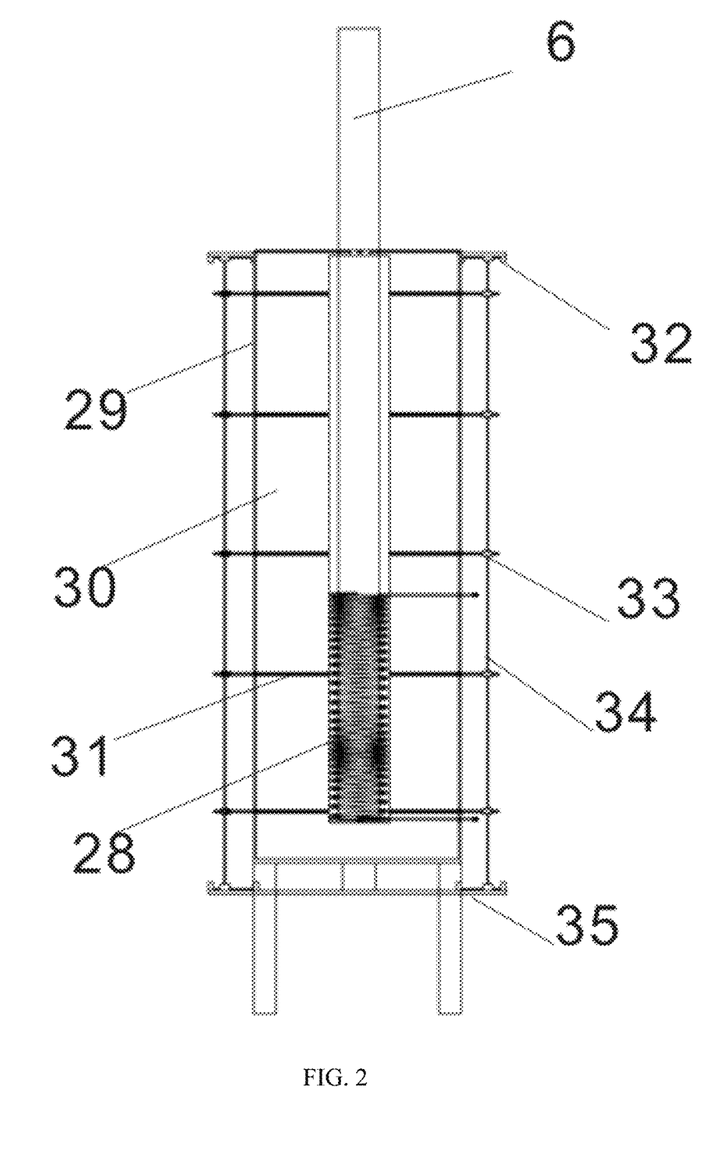
FIG. 2 is a front sectional view of a convenient temperature measurement box.
Figure 3:
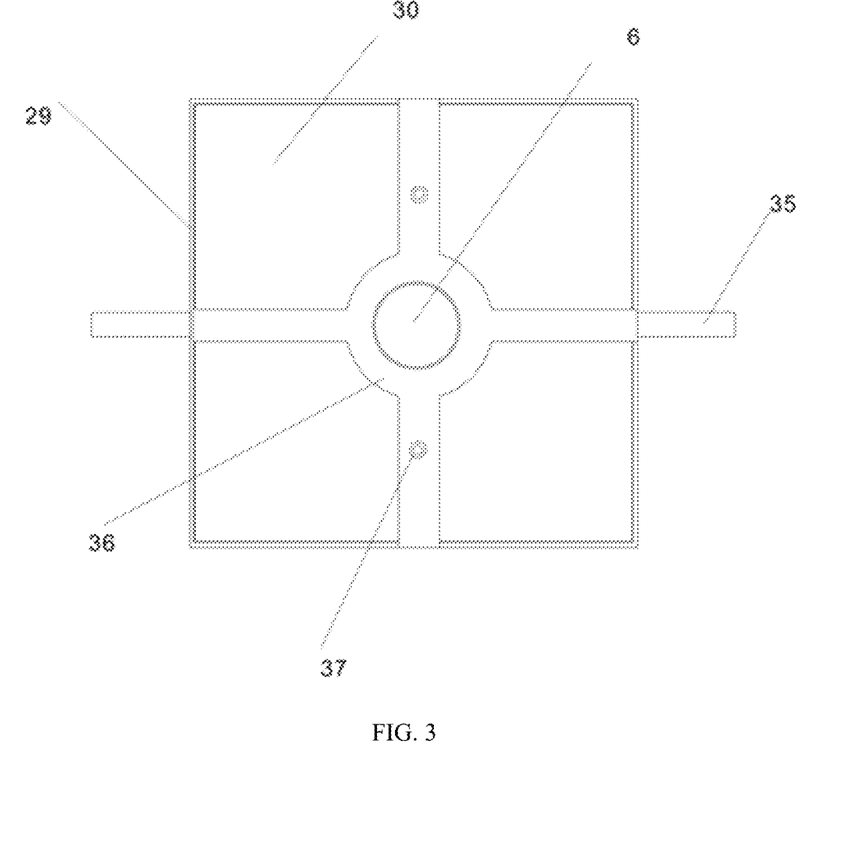
FIG. 3 is a top view of the convenient temperature measurement box.

As shown in FIG. 2 and FIG. 3, the convenient temperature measurement box 1 includes a box body 29, thermal insulation filling material 30, conduits 31, step motors 32, clamp components 33, a fixing plate 34, slide rails 35, K-type insulated thermocouples 5, a gas-cooled jacket support plate 36, and bolts 37. The gas-cooled jacket support plate 36 is disposed at the top of the box body 29. The bolts 37 are fixed to the gas-cooled jacket support plate 36. The thermal insulation filling material 30 is located inside the box body 29. There are two slide rails 35, which are respectively disposed at the upper and lower ends of the box body 29. An end of each slide rail 35 is disposed with the step motor 32. The step motors 32 are connected to the fixing plate 34 by screws, and configured to drive the fixing plate 34 to move. An end of each clamp component 33 is horizontally fixed to the fixing plate 34, and configured to clamp and fix an end of the corresponding K-type insulated thermocouple 5 by a clamp head 42. The other end of the corresponding K-type insulated thermocouple 5 is disposed in one of the conduits 31. The conduits 31 pass through the box body 29 and terminate at the high-temperature heat pipe 6. The K-type insulated thermocouples 5 are pushed to move by the fixing plate 34.

Figure 4:
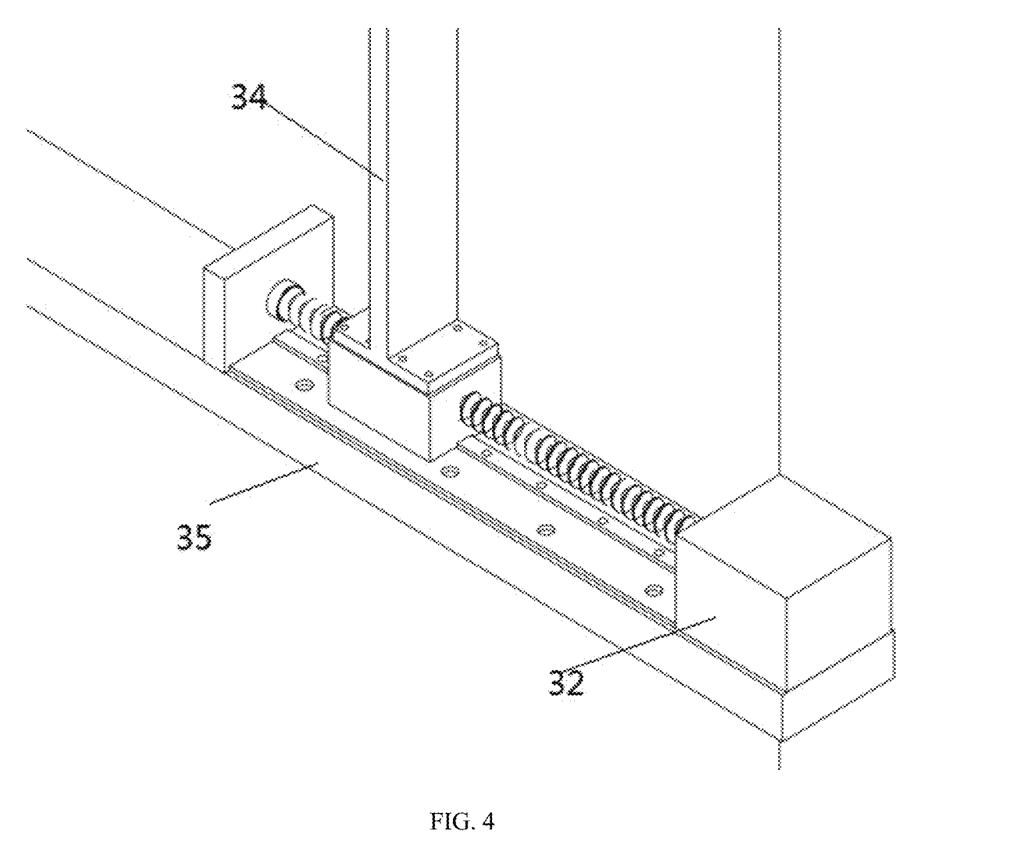
FIG. 4 is a partial enlarged view of a slide rail.

As shown in FIG. 4, a control program controls the step motors 32 on the same side to move at the same time, so as to drive the fixing plate 34, thereby driving the K-type insulated thermocouples 5 to move. After the K-type insulated thermocouples 5 are in contact with the high-temperature heat pipe 6, the step motors 32 receive a resistance signal, and feed the signal back to the computer 3. When the value of the resistance signal is greater than a preset value, the control program immediately disables the step motors 32, which indicates that the K-type insulated thermocouples 5 have been closely attached to the high-temperature heat pipe 6.

Figure 5:
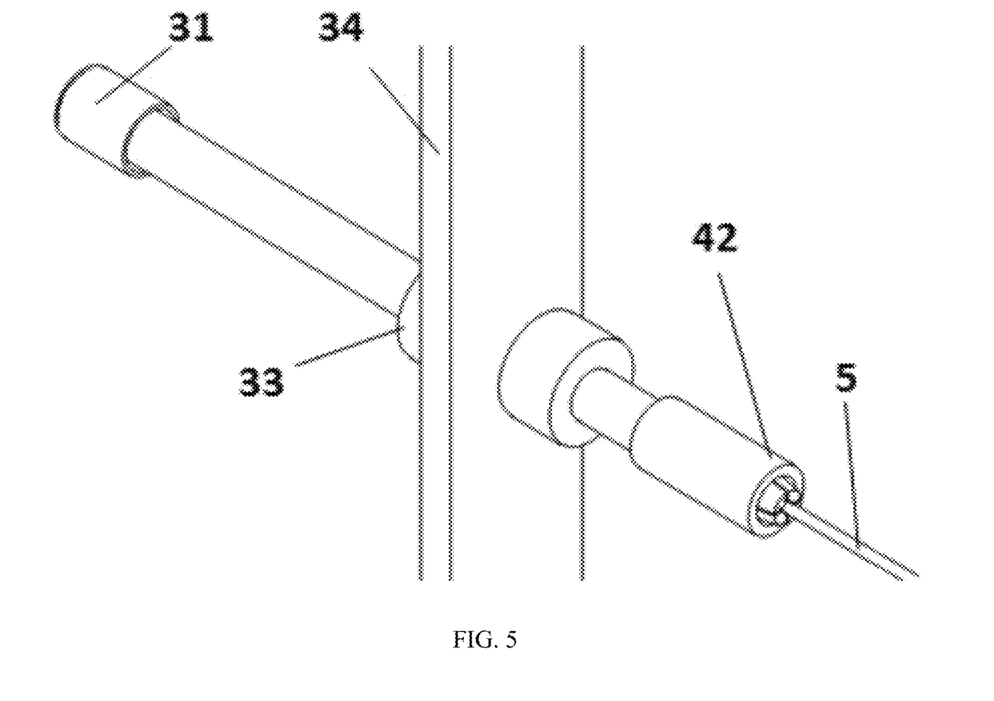
FIG. 5 is a partial enlarged view of a fixing plate.

As shown in FIG. 5, one end of the clamp component 33 is fixed to the fixing plate 34, and the other end of the clamp component 33 passes through the corresponding conduit 31. The clamp head 42 of the clamp component 33 clamps and fixes an end of the corresponding K-type insulated thermocouple 5.

Figure 6:
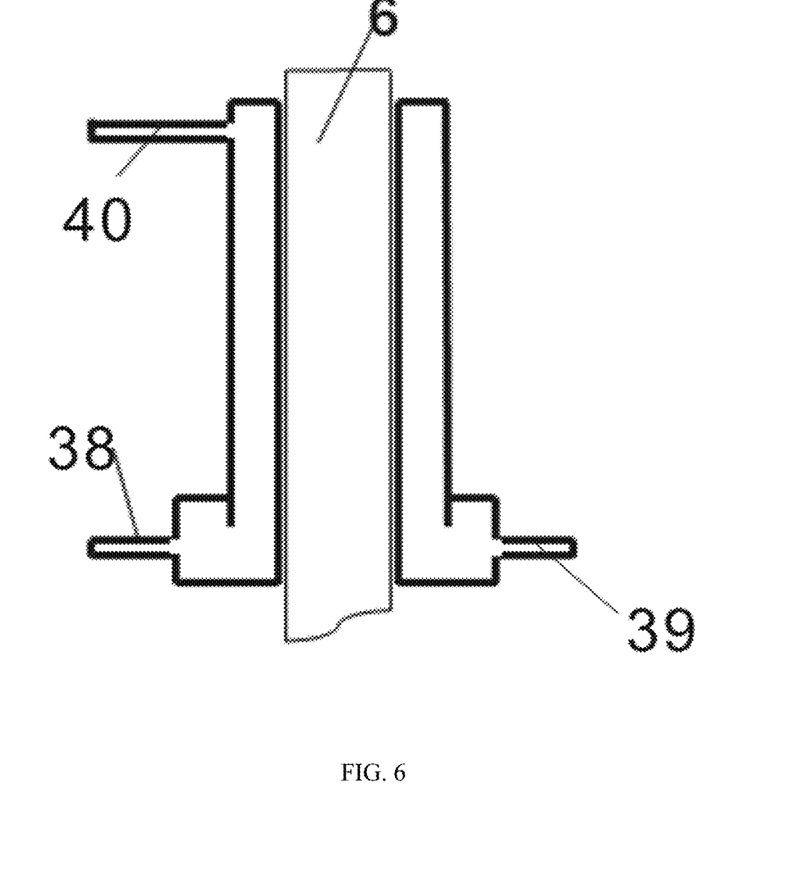
FIG. 6 is a front sectional view of a gas-cooled jacket.
Figure 7:
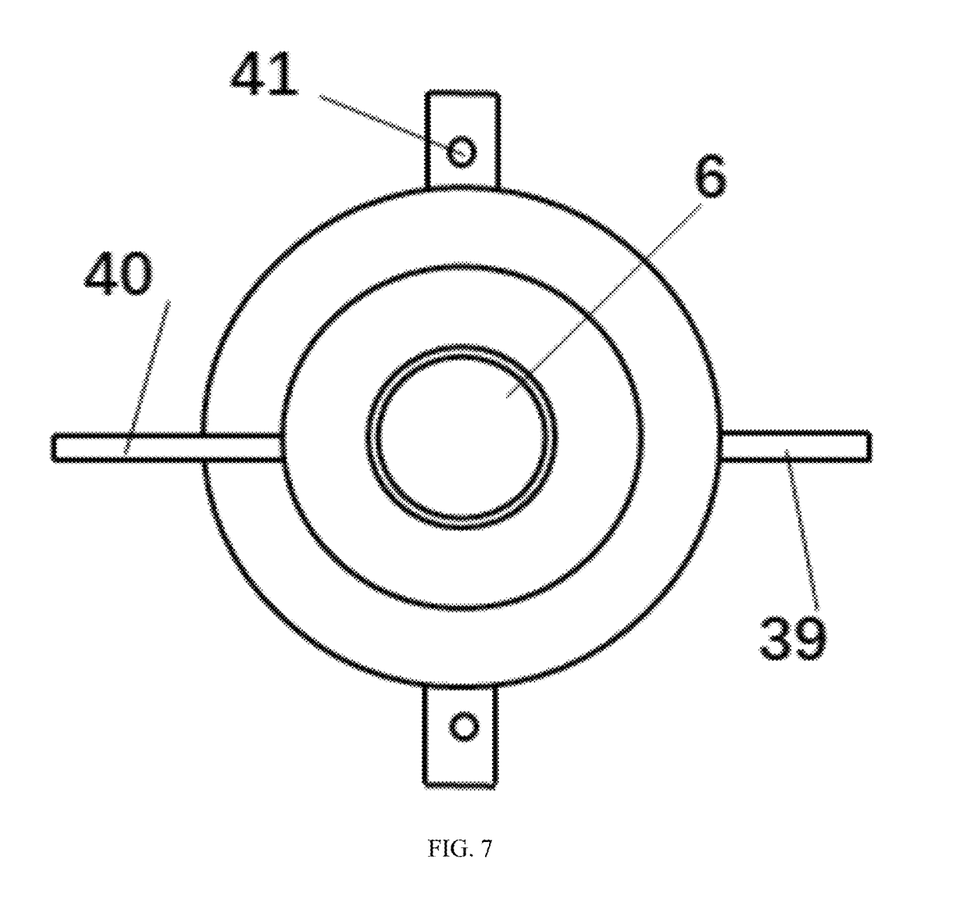
FIG. 7 is a top view of the gas-cooled jacket.

As shown in FIG. 6 and FIG. 7, the gas-cooled jacket 23 includes threaded holes 41, a first gas-cooled jacket inlet 38, a second gas-cooled jacket inlet 39, and a gas-cooled jacket outlet 40. The gas-cooled jacket 23 is disposed outside the high-temperature heat pipe 6. The gas-cooled jacket 23 is fixed to the gas-cooled jacket support plate 36 by nuts after the bolts 37 pass through the threaded holes 41. The first gas-cooled jacket inlet 38 is disposed on a side of the bottom of the gas-cooled jacket 23, and the second gas-cooled jacket inlet 39 is disposed on the other side of the bottom of the gas-cooled jacket 23. The gas-cooled jacket outlet 40 is disposed at the top of the gas-cooled jacket 23.

Figure 8:
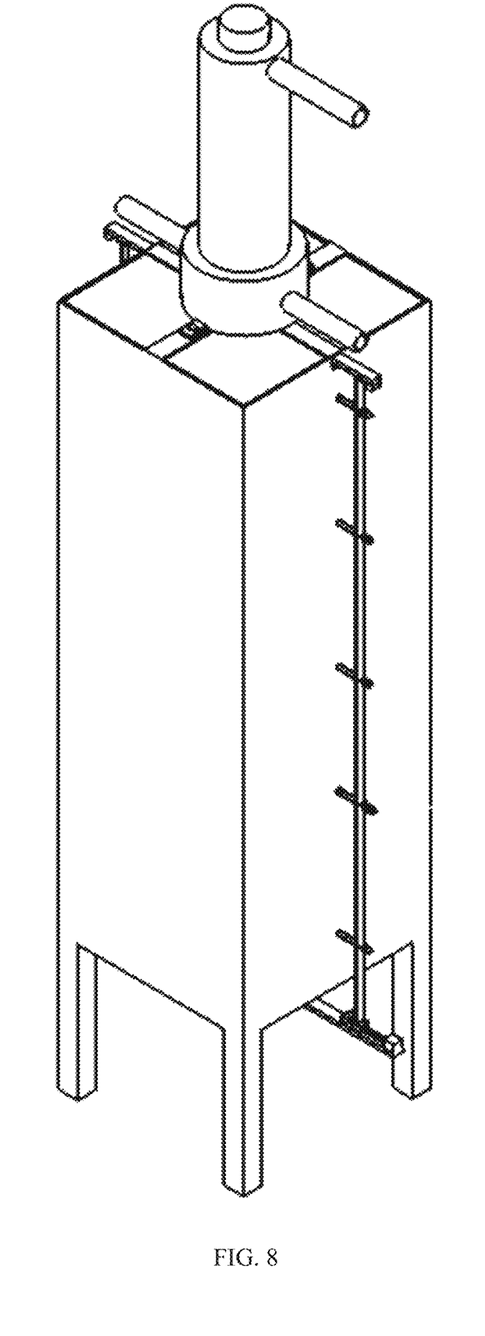
FIG. 8 is a diagram showing a connection relationship between the convenient temperature measurement box and the gas-cooled jacket.

As shown in FIG. 8, the gas-cooled jacket 23 is fixed to the upper part of the convenient temperature measurement box 1 by the nuts after the bolts 37 pass through the threaded holes 41.

Figure 9:
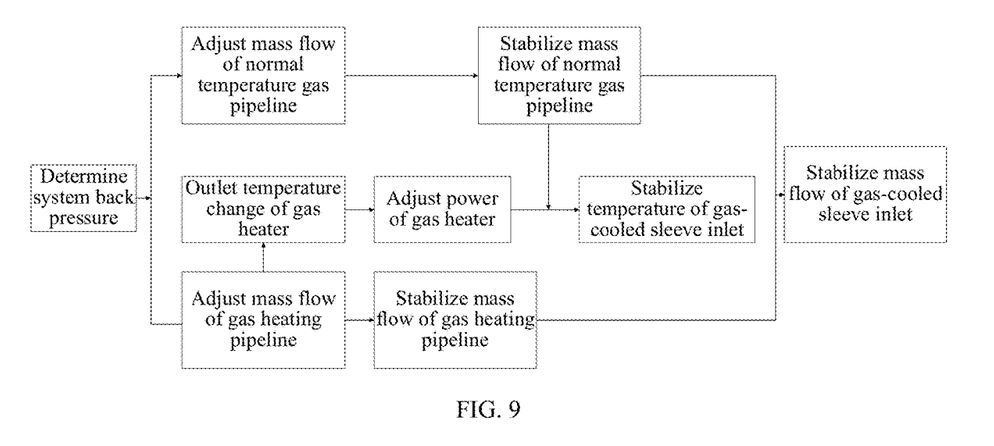
FIG. 9 is a flowchart of mass flow rate and temperature change.

As shown in FIG. 9, the system determines that there are changes in the system back pressure and the system mass flow rate by the back pressure control valve 24, and inputs control signals to the first mass flow controller 13 and the second mass flow controller 18 respectively according to the experimental working condition, to adjust the mass flow rates in the gas heating pipeline and the normal temperature gas pipeline until the mass flow rates are stable, so as to control the mass flow rate at the inlet of the gas-cooled jacket 23. The system inputs a temperature control signal to the gas heater 14 in the gas heating pipeline according to the experimental working condition, to allow the gas heater 14 to adjust its heating power according to the outlet temperature of the gas heater 14 until a preset temperature is reached. The gas mixer 20 mixes the gas in the gas heating pipeline and the gas in the normal temperature gas pipeline, and outputs the mixed gas to the inlet of the gas-cooled jacket 23.

In some embodiments of the present disclosure, the box body 29 is made of 316L stainless steel, which is able to effectively prevent gas and liquid corrosion, is not easy to deform at high temperatures, and has heat resistance. A row of round holes are respectively defined on the left and right sides of the box body 29 for inserting the conduits 31. The thermal insulation filling material 30 has modular design according to the structure of the box body 29, which helps to place the electric heating wire 28 into the box body 29. When the thermal insulation filling material 30 is damaged, only the damaged part needs to be replaced, thereby saving the cost. The thermal insulation filling material 30 having modular design is placed into the box body 29 from above the box body 29, and then covered by the gas-cooled jacket support plate 36, which ensures that the box body 29 is in close contact with the thermal insulation filling material 30. The conduits 31 are made of nickel-chromium alloy, thus are not easy to deform at high temperatures. Besides, the conduits 31, as the entry channels for the K-type insulated thermocouples 5, have pipe hole diameters not more than 2 mm. The orifices of the conduits 31 are fixed to the box body 29 by means of welding. One pair of conduits 31 are oppositely disposed at the same temperature measuring point, to prevent single point failure. The slide rails 35 are welded to the upper and lower ends of the box body 29, and each of the left and right sides of the box body 29 is provided with one group, to allow the step motors 32 to move left and right respectively. The step motors 32 are connected to the computer 3, and the moving distance and moving direction of the step motors 32 are controlled by the program. The motion states of the two step motors 32 on the same side are consistent, so that each position of the fixing plate 34 has an equal moving distance, thereby ensuring that the K-type insulated thermocouples 5 on the same side are closely attached to the outer wall surface of the high-temperature heat pipe 6. The fixing plate 34 is made of aluminum-magnesium alloy, which has the characteristics of light weight and strong anti-seismic force. The upper and lower ends of the fixing plate 34 are respectively connected with the step motors 32, to ensure no deformation of the step motors 32 during the motion. An end of each clamp component 33 is fixed to the fixing plate 34 by means of welding, and the other end of the clamp component 33 clamps and fixes the corresponding K-type insulated thermocouple 5 horizontally. The gas-cooled jacket support plate 36 is provided with bolts 37 on both the upper and lower sides, for fixing the gas-cooled jacket 23. The high-temperature heat pipe 6 is inserted from the center of the gas-cooled jacket support plate 36 and then fixed.

In view of the problems in the related art, the present disclosure provides the heat transfer limit experimental device exchanging heat through gas cooling and the method based on the heat transfer limit experimental device. According to the present disclosure, the gas temperature can be adjusted rapidly in a large range, which allows the cooling capacity to be changed rapidly in a large range, thereby meeting the experimental requirements for the heat transfer limit of the high-temperature heat pipe. According to the convenient temperature measurement box provided in the present disclosure, the fixing plate is driven by the step motors, to drive the K-type insulated thermocouples to move back and forth. There is no need to mount the K-type insulated thermocouples during the assembly of the experimental system, thereby improving efficiency and reducing human errors. Moreover, the step motors controlled by the control system can feed back the resistance signal, to allow the K-type insulated thermocouples to be in close attachment with the outer wall of the heat pipe, thereby improving the accuracy of the temperature measurement data.

What is claimed is:

1. A heat transfer limit experimental device of a high-temperature heat pipe equipped with a temperature measurement box, comprising:

a high-temperature heat pipe (6), an electric heating system (2), a temperature measurement box (1), a control system, a gas-cooled heat exchange system and a data acquisition system; wherein the electric heating system (2) is connected to the high-temperature heat pipe (6);

the temperature measurement box (1) is connected to the gas-cooled heat exchange system; the data acquisition system is connected to the gas-cooled heat exchange system, the temperature measurement box (1), and the electric heating system (2); the control system is connected to the gas-cooled heat exchange system, the temperature measurement box (1), and the electric heating system (2); and the high-temperature heat pipe (6) is disposed inside the temperature measurement box (1);

the temperature measurement box (1) comprises a box body (29), thermal insulation tilling material (30), a conduit (31), step motors (32), a clamp component (33), a fixing plate (34), two slide rails (35), a K-type insulated thermocouple (5), a gas-cooled jacket support plate (36), and a bolt (37); wherein the gas-cooled jacket support plate (36) is disposed on the top of the box body (29); the bolt (37) is fixed to the gas-cooled jacket support plate (36); the thermal insulation filling material (30) is located inside the box body (29); the two slide rails (35) are disposed at an upper end and a lower end of the box body (29) respectively; an end of each slide rail (35) is disposed with one of the step motors (32); the step motors (32) are connected to the fixing plate (34) through screws, and configured to drive the fixing plate (34) to move; an end of the clamp component (33) is horizontally fixed to the fixing plate (34), and configured to clamp and fix an end of the K-type insulated thermocouple (5) by a clamp head (42); the other end of the K-type insulated thermocouple (5) is disposed in the conduit (31); the conduit (31) passes through the box body (29) and terminates at the high-temperature heat pipe (6); and the K-type insulated thermocouple (5) is pushed to move by the fixing plate (34);

the gas-cooled heat exchange system comprises an air compressor (7), a gas storage tank (8), a filter (9), a refrigerant dryer (10), a pressure reducing valve (11), a first shut-off valve (12), a first mass flow controller (13), a gas heater (14), a safety valve (15), a first check valve (16), a second shut-off valve (17), a second mass flow controller (18), a second check valve (19), a gas mixer (20), a differential pressure mass flowmeter (21), a pressure transmitter (22), a gas-cooled jacket (23), and a back pressure control valve (24); wherein, the air compressor (7) is connected to an inlet of the gas storage tank (8); an outlet of the gas storage tank (8) is connected to an inlet of the filter (9); an outlet of the filter (9) is connected to an inlet of the refrigerant dryer (10); an outlet of the refrigerant dryer (10) is connected to an inlet of the pressure reducing valve (11); an outlet of the pressure reducing valve (11) is connected to an inlet of the first shut-off valve (12) and an inlet of the second shut-off valve (17) via a three-way pipe; an outlet of the first shut-off valve (12) is connected to an inlet of the first mass flow controller (13); an outlet of the first mass flow controller (13) is connected to an inlet of the gas heater (14); an outlet of the gas heater (14) is connected to an inlet of the first check valve (16) and the safety valve (15); an outlet of the first check valve (16) is connected to a first inlet of the gas mixer (20); an outlet of the gas mixer (20) is connected to an inlet of the differential pressure mass flowmeter (21); an outlet of the differential pressure mass flowmeter (21) is connected to an inlet of the pressure transmitter (22); an outlet of the pressure transmitter (22) is connected to an inlet of the gas-cooled jacket (23); an outlet of the gas-cooled jacket (23) is connected to the back pressure control valve (24); an outlet of the second shut-off valve (17) is connected to an inlet of the second mass flow controller (18); an outlet of the second mass flow controller (18) is connected to an inlet of the second check valve (19); and an outlet of the second check valve (19) is connected to a second inlet of the gas mixer (20); and the gas-cooled jacket (23) comprises a threaded hole (41), a first gas-cooled jacket inlet (38), a second gas-cooled jacket inlet (39), and a gas-cooled jacket outlet (40); wherein the gas-cooled jacket (23) is disposed outside the high-temperature heat pipe (6); the gas-cooled jacket (23) is fixed to the gas-cooled jacket support plate (36) by a nut after the bolt (37) passes through the threaded hole (41); the first gas-cooled jacket inlet (38) is disposed on a side of the bottom the gas-cooled jacket (23); the second gas-cooled jacket inlet (39) is disposed on the other side of the bottom of the gas-cooled jacket (23); and the gas-cooled jacket outlet (40) is disposed at the top of the gas-cooled jacket (23).

2. The heat transfer limit experimental device according to claim 1, wherein the electric heating system (2) comprises:

an electric heating wire (28); and a direct-current (DC) power supply (27); wherein, the DC power supply (27) is connected to the electric heating wire (28); and the electric heating wire (28) is spirally wound around an end of the high-temperature heat pipe (6).

3. The heat transfer limit experimental device according to claim 2, wherein the data acquisition system comprises:

an inlet thermocouple (25);

an outlet thermocouple (26);

the K-type insulated thermocouple (5);

a data acquisition card (4); and a computer (3); wherein, the data acquisition card (4) is connected to the inlet thermocouple (25), the outlet thermocouple (26), and the K-type insulated thermocouple (5); and the computer (3) is connected to the data acquisition card (4).

4. The heat transfer limit experimental device according to claim 3, wherein the control system further comprises:

the computer (3) being connected to the first mass flow controller (13), the gas heater (14), the second mass flow controller (18), the back pressure control valve (24), and the step motors (32).

* * * * *